US011368392B2

(12) United States Patent
Dai (10) Patent No.: US 11,368,392 B2
(45) Date of Patent: Jun. 21, 2022

(54) FORWARDING PACKET IN MPLS NETWORK (71) Applicant: NEW H3C TECHNOLOGIES CO., LTD., Hangzhou (CN)

(72) Inventor: Li Dai, Beijing (CN)

(73) Assignee: New H3C Technologies Co., Ltd., Hangzhou (CN)

(*) Notice: Subject to any disclaimer, the term of this patent is extended or adjusted under 35 U.S.C. 154(b) by 0 days.

(21) Appl. No.: 16/624,894

(22) PCT Filed: Jun. 14, 2018

(86) PCT No.: PCT/CN2018/091233
§ 371 (c)(1),
(2) Date: Dec. 19, 2019

(87) PCT Pub. No.: WO2018/233538
PCT Pub. Date: Dec. 27, 2018

(65) Prior Publication Data
US 2020/0136961 A1    Apr. 30, 2020

(30) Foreign Application Priority Data

Jun. 20, 2017 (CN) .......................... 201710469318.8

(51) Int. Cl.
H04L 45/30 (2022.01)
H04L 12/46 (2006.01)
(Continued)

(52) U.S. Cl.
CPC ........ *H04L 45/306* (2013.01); *H04L 12/4645* (2013.01); *H04L 45/50* (2013.01)

(58) Field of Classification Search
None
See application file for complete search history.

(56) References Cited

U.S. PATENT DOCUMENTS

2007/0121615 A1* 5/2007 Weill ................. H04L 47/2441
370/389
2007/0165530 A1* 7/2007 Dong ..................... H04L 12/66
370/235

(Continued)

FOREIGN PATENT DOCUMENTS

CN        1866868 A     11/2006
CN      101471880 A      7/2009
(Continued)

OTHER PUBLICATIONS

"Allocating and Retiring Special Purpose MPLS Labels", Kompella, Juniper Networks, 2014 (Year: 2014).*

(Continued)

Primary Examiner — Jay L Vogel
(74) Attorney, Agent, or Firm — McCoy Russell LLP (57) ABSTRACT A method and an apparatus for forwarding a packet in a Multi-Protocol Label Switching (MPLS) network are provided. Based on an example of the method, a Provider Edge (PE) device assigns a private network application identifier to a received Internet Protocol (IP) packet and sends a Multi-Protocol Label Switching (MPLS) packet that is generated based on the IP packet and carries the private network application identifier in an extension label. In this way, when receiving the MPLS packet, a Provider (P) device may identify the private network application to which the MPLS packet belongs based on the private network application identifier in the extension tag.

8 Claims, 5 Drawing Sheets (51) Int. Cl.
  *H04L 45/50* (2022.01)
  *H04L 47/2475* (2022.01)
  *H04L 45/302* (2022.01)

(56) References Cited

U.S. PATENT DOCUMENTS

| | | | |
|---|---|---|---|
| 2010/0220739 A1 | 9/2010 | Ishiguro | |
| 2012/0120952 A1 | 5/2012 | Jalan et al. | |
| 2014/0122791 A1* | 5/2014 | Fingerhut | G11C 15/00 711/108 |
| 2015/0003231 A1* | 1/2015 | Chen | H04L 45/22 370/221 |
| 2015/0078379 A1* | 3/2015 | Wijnands | H04L 45/16 370/390 |
| 2015/0109902 A1* | 4/2015 | Kumar | H04L 41/0668 370/219 |
| 2015/0263940 A1* | 9/2015 | Kini | H04L 45/50 370/236.2 |
| 2016/0261497 A1* | 9/2016 | Arisoylu | H04L 12/2896 |
| 2018/0351882 A1* | 12/2018 | Jeganathan | H04L 45/50 |

FOREIGN PATENT DOCUMENTS

| | | |
|---|---|---|
| CN | 102143030 A | 8/2011 |
| CN | 103209124 A | 7/2013 |
| CN | 106059887 A | 10/2016 |
| JP | 2015119345 A | 6/2015 |
| WO | 2009051179 A1 | 4/2009 |

OTHER PUBLICATIONS

Kompella, K. et al., "Allocating and Retiring Special-Purpose MPLS Labels," Internet Engineering Task Force Website, Available Online at https://tools.ietf.org/html/rfc7274, Jun. 12, 2014, 11 pages.

Bryant, S. et al., "MPLS Flow Identification Considerations; draft-ietf-mpls-flow-ident-04," Internet Engineering Task Force Website, Available Online at https://tools.ietf.org/html/draft-ietf-mpls-flow-ident-04, Feb. 24, 2017, 11 pages.

European Patent Office, Extended European Search Report Issued in Application No. 18821589.1, dated Mar. 23, 2020, Germany, 9 pages.

State Intellectual Property Office of the People's Republic of China, Office Action and Search Report Issued in Application No. 201710469318.8, dated Jun. 22, 2020, 11 pages (Submitted with Machine Translation).

ISA State Intellectual Property Office of the People's Republic of China, International Search Report Issued in Application No. PCT/CN2018/091233, dated Aug. 1, 2018, WIPO, 4 pages.

State Intellectual Property Office of the People's Republic of China, Office Action and Search Report Issued in Application No. 201710469318.8, dated Apr. 29, 2019, 12 pages. (Submitted with Partial Translation).

State Intellectual Property Office of the People's Republic of China, Decision of Rejection Issued in Application No. 201710469318.8, dated Nov. 3, 2020, 10 pages. (Submitted with Machine Translation).

Japanese Patent Office, Office Action Issued in Application No. 2019-569916, dated Nov. 24, 2020, 11 pages (Submitted with Machine Translation).

ISA State Intellectual Property Office of the People's Republic of China, Written Opinion of the International Searching Authority Issued in Application No. PCT/CN2018/091233, dated Aug. 1, 2018, WIPO, 3 pages.

State Intellectual Property Office of the People's Republic of China, Office Action and Search Report Issued in Application No. 201710469318.8, dated Dec. 23, 2019, 11 pages. (Submitted with Partial Translation).

European Patent Office, Office Action Issued in Application No. 18821589.1, dated Feb. 24, 2021, Netherlands, 6 pages.

Japanese Patent Office, Decision of Refusal Issued in Application No. 2019-569916, dated Jun. 29, 2021, 5 pages. (Submitted with Machine Translation).

* cited by examiner

FORWARDING PACKET IN MPLS NETWORK

CROSS-REFERENCE TO RELATED APPLICATIONS

The present application is a U.S. National Phase of International Patent Application Serial No. PCT/CN2018/091233 entitled "PACKET FORWARDING IN MPLS NETWORK," filed on May 31, 2018. International Patent Application Serial No. PCT/CN2018/091233 claims priority to Chinese Patent Application No. 201710469318.8, filed on Jun. 20, 2017, The entire contents of each of the above-cited applications are hereby incorporated by reference in their entirety for all purposes.

BACKGROUND

Multi-Protocol Label Switching (MPLS) is a backbone network technology. An MPLS-based Virtual Private Network (VPN) architecture includes a Customer Edge (CE) device, a Provider Edge (PE) device and a Provider (P) device, where the P device may perform packet forwarding based on MPLS label without paying attention to specific application in a packet.

DETAILED DESCRIPTION OF THE EMBODIMENTS

Illustrative examples will be described in detail herein with the examples thereof expressed in the drawings. When the following descriptions involve the drawings, like numerals in different drawings represent like or similar elements unless stated otherwise.

It is to be understood that although different information may be described using the terms such as first, second, and third in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

As described in Background, a P device in an MPLS-based VPN may perform packet forwarding based on an MPLS label but may not have capability of identifying a private network application. Further, with continuously increased demand of a user, the user may desire to visualize a private network flow in an MPLS network. For example, the private network application may be identified by use of a Differentiated Services Code Point (DSCP) field in an Internet Protocol (IP) packet or an EXP field in an MPLS label (a public network label and a private network label). In this way, the P device may identify the private network application by analyzing a value of the DSCP field in the IP packet or a value of the EXP field so as to implement visualization of the private network flow in the MPLS network.

However, the DSCP field and the EXP field are usually used to define a service priority so that different Quality of Service (QoS) may be provided based on different service priorities. Thus, if the original meaning of the DSCP field or the EXP field is changed, the QoS service of a network will be affected.

The present disclosure provides a method of forwarding a packet. Based on the method, an extension label in an MPLS packet may be carried with a private network application identifier so that a P device may identify a private network application by analyzing the extension label. Because a priority field of an IP packet or an MPLS label (a public network label and a private network label) is not occupied, the method will not affect QoS processing based on priority.

Figure 1:
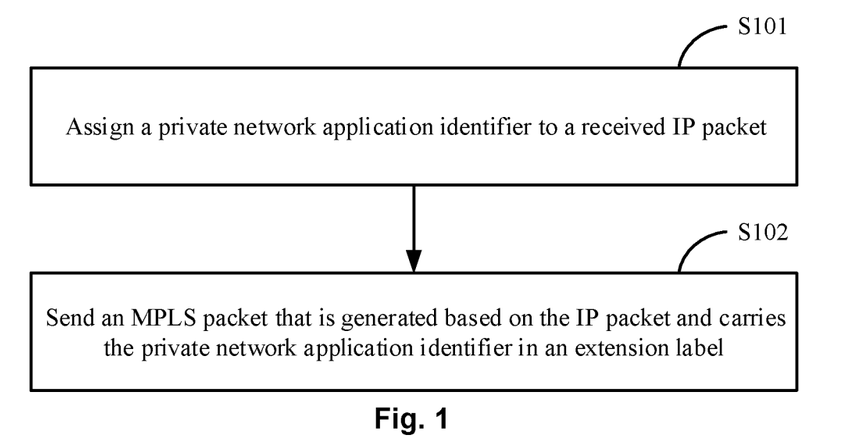
FIG. 1 is a flowchart illustrating a method of forwarding a packet based on an example of the present disclosure.

FIG. 1 is a flowchart illustrating a method of forwarding a packet based on an example of the present disclosure. In this example, a process of forwarding a packet at an ingress PE device side in an MPLS network is described.

At block 101, the ingress PE device may assign a private network application identifier to a received IP packet.

When a user desires to visualize the private network application on the P device of the MPLS network so as to, for example, perform statistics for a flow of the private network application, an Access Control List (ACL) entry for the private network application may be preconfigured on the PE device. For example, packet features (for example, five-tuple information, a VPN and so on) of an IP packet of the private network application may be added to the ACL entry for the private network application. In this way, when the packet features of the IP packet received by the PE device are matched with the preconfigured ACL entry, it indicates that the IP packet is a packet of a private network application to be made visualization processing by P device. In this case, the PE device may assign a corresponding private network application identifier to the IP packet. Table 1 shows a correspondence between an ACL entry and a private network application identifier.

TABLE 1

| ACL entry | Private network application identifier |
|---|---|
| ACL 1 | 1 |
| ACL 2 | 2 |
| ACL 3 | 3 |
| ... | ... |

Each ACL entry represents a private network application. A corresponding private network application identifier may be determined based on an ACL entry matched with an IP packet. Of course, a plurality of private network applications may also be divided into groups in a way that one private network application group corresponds to one private network application identifier. In other words, all private network applications in one private network application group may share one private network application identifier and correspond to a same ACL entry.

At block 102, the ingress PE device may send an MPLS packet generated based on the IP packet, where the private network application identifier is carried in an extension label of the MPLS packet.

In the present disclosure, a private network application identifier may be carried in an extension label of an MPLS packet. The extension label may include three sub-labels: a first sub-label, a second sub-label and a third sub-label. The first sub-label is used to indicate the second sub-label is an extension-purpose label. For example, the first sub-label may use an Extension Label (XL) in an MPLS protocol and its label value may select a standard extension label value 15 defined in a RFC7274 to indicate that a subsequent sub-label is an extension-purpose label. The second sub-label is used to indicate the third sub-label carries a private network application identifier. For example, the second sub-label may use an Extended Special-Purpose MPLS Label (ESPL) in the MPLS protocol, and its label value may select a label value, for example, 100, that is not assigned in The Internet Assigned Numbers Authority (IANA) to indicate that the third sub-label carries a private network application identifier. The third sub-label is used to carry the private network application identifier assigned at block 101.

Figure 2:
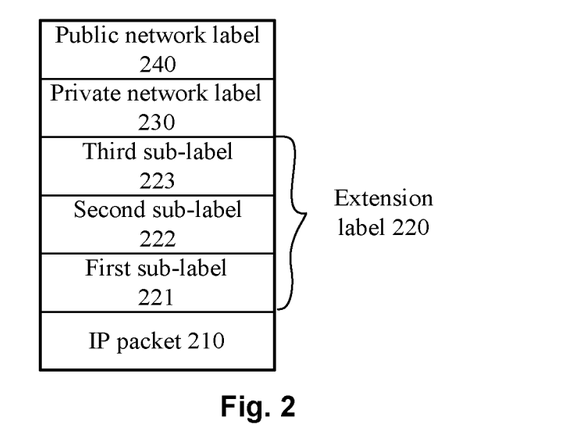
FIG. 2 is a schematic diagram illustrating a format of an MPLS packet encapsulated with an MPLS label based on an example of the present disclosure.

FIG. 2 is a schematic diagram illustrating a format of an MPLS packet encapsulated with an MPLS label based on an example of the present disclosure. In this diagram, an IP packet 210 may be encapsulated with an extension label 220 and encapsulated with a private network label 230 and a public network label 240. It is noted that an encapsulation position of an extension label is not limited in the present disclosure. For example, the IP packet 210 may be firstly encapsulated with the private network label 230 and then encapsulated with the extension label 220 and the public network label 240. That is, the extension label 220 may be encapsulated between the private network label 230 and the public network label 240.

Figure 3:
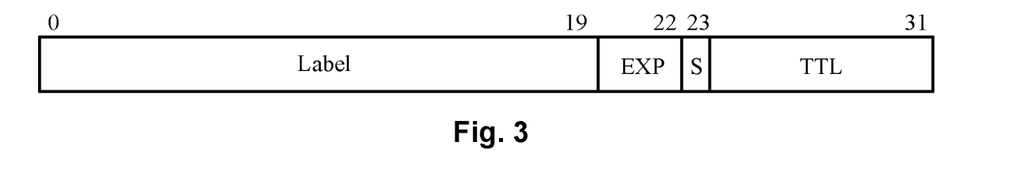
FIG. 3 is a schematic diagram illustrating a label structure based on an example of the present disclosure.

In the present disclosure, a first sub-label 221, a second sub-label 222 and a third sub-label 223 in the extension label 220 may have the same label structure as the private network label 230 and the public network label 240. FIG. 3 is a schematic diagram illustrating a label structure, where a Label field indicates a label value and a length of the Label field is 20 bits. The label value 15 of the first sub-label 221, the label value 100 of the second sub-label 222 and the label value "a private network application identifier" of the third sub-label 223 may all be stored in their respective Label fields. It can be seen that a number of private network applications indicated by the 20-bit Label field in the third sub-label 223 is far greater than a number of private network applications indicated by a priority field (for example, a DSCP field or an EXP field), so that the private network applications can be refined further and flow statistics of more private network applications can be provided.

Further, the extension label in the present disclosure may also include information of a VPN to which an IP packet belongs. For example, the information of the VPN to which the IP packet belongs may be indicated by the first 5 bits of the Label field of the third sub-label and specific private network application information may be indicated by the last 15 bits of the Label field of the third sub-label. In this way, the P device may determine a VPN to which a private network application belongs based on the VPN information and may also perform statistics for private network flow based on the VPN.

Figure 4:
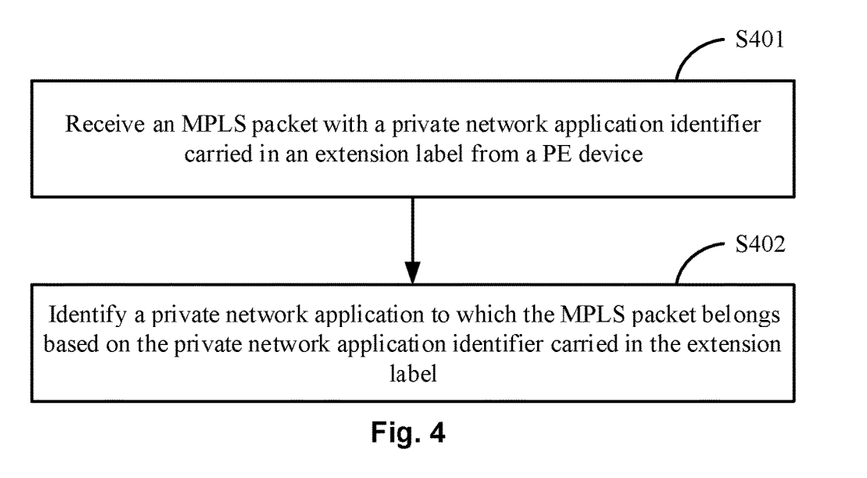
FIG. 4 is a flowchart illustrating another method of forwarding a packet based on an example of the present disclosure.

FIG. 4 is a flowchart illustrating a method of forwarding a packet based on another example of the present disclosure. In this example, a process for forwarding a packet at a P device side is described.

At block 401, the P device may receive an MPLS packet with a private network application identifier carried in an extension label from a PE device.

At block 402, the P device may identify a private network application based on the private network application identifier carried in the extension label.

The P device may forward the MPLS packet based on the public network label in the MPLS packet. Further, the P device may obtain a label value of the first sub-label by analyzing the extension label in the MPLS packet. When determining that the second sub-label is an extension-purpose label based on the label value of the first sub-label, the P device may continue to obtain a label value of the second sub-label. When determining that the third sub-label carries a private network application identifier based on the label value of the second sub-label, the P device may continue to obtain a label value of the third sub-label and identify a private network application based on the label value of the third sub-label.

For example, when the label value of the first sub-label is 15, it indicates that the second sub-label is an extension-purpose label. When the label value of the second sub-label is 100, it indicates that the third sub-label carries a private network application identifier. When the label value of the third sub-label is obtained as, for example, 1, it is determined that the private network application identifier of the private network application to which the currently-received IP packet belongs is 1, and statistics may be further performed for the flow of the private network application, that is, visualization of the private network flow on the P device is implemented.

When the MPLS packet reaches an egress PE device of the MPLS network, the egress PE device may remove all labels of the MPLS packet and forward the IP packet based on an existing processing manner, which will not be described herein.

It can be seen from the above descriptions that, in the present disclosure, the extension label of the MPLS packet may carry the private network application identifier, without occupying the priority field in the IP packet or the MPLS packet. Thus, the QoS processing based on priority will not be affected and extensibility and compatibility become better.

Figure 5:
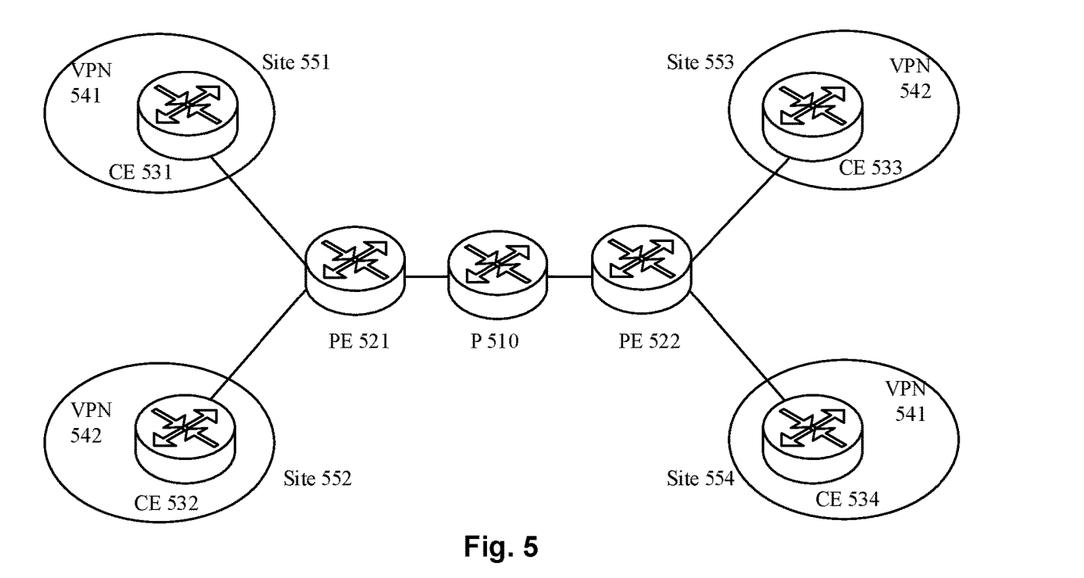
FIG. 5 is a schematic diagram illustrating an MPLS network based on an example of the present disclosure.

A process of forwarding a packet will be described with the MPLS network shown in FIG. 5 as an example.

The MPLS network may include CE devices 531-534, PE devices 521, 522 and a P device 510 and carry flows of a VPN 541 and a VPN 542.

It is assumed that it is desired to perform on the P device 510 flow statistics for a first private network application and a second private network application in the VPN 541. The flow of the first private network application is a flow sent by a first host with an IP address as IP11, for example, a Personal Computer (PC) (not shown), in a site 551 to a second host with an IP address as IP41, for example, a PC (not shown), in a site 554; and the flow of the second private network application is a flow sent by a third host with an IP address as IP12, for example, a PC (not shown), in the site 551 to a fourth host with an IP address as IP42, for example, a PC (not shown), in the site 554.

Two ACL entries (ACL1 and ACL2) may be preset on the PE device 521. Five-tuple information of the flow sent to the second host from the first host may be added to the ACL entry ACL1 and five-tuple information of the flow sent to the fourth host from the third host may be added to the ACL entry ACL2.

Figure 6:
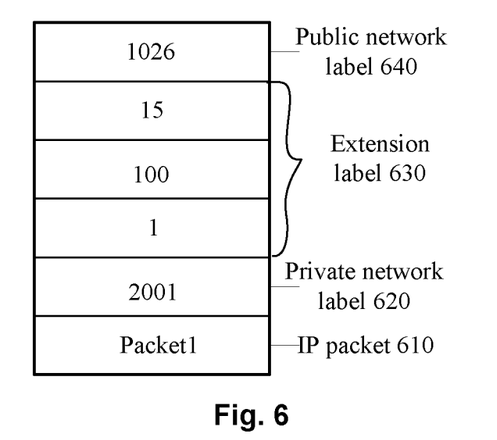
FIG. 6 is a schematic diagram illustrating an MPLS packet apparatus based on an example of the present disclosure.

When receiving an IP packet (denoted as Packet1) matched with the ACL entry ACL1, the PE device 521 may assign a private network application identifier 1 to the packet1 based on the above Table 1. Then, the PE device 521 may perform MPLS label encapsulation for the packet1 as shown in FIG. 6. An extension label 630 may include three sub-labels which are a first sub-label, a second sub-label and a third sub-label from top to bottom. Further, the label value of the first sub-label is 15, indicating that the second sub-label is an extension-purpose label. The label value of the second sub-label is 100, indicating that the third sub-label carries a private network application identifier. The label value of the third sub-label is 1, indicating a private network application identifier that the PE device 521 assigns to the packet1. The PE device 521 may forward the encapsulated MPLS packet (denoted as MPLS1) to the P device 510.

After receiving the packet MPLS1, the P device 510 may analyze the MPLS label of the packet to obtain the label value 15 from the first sub-label of the extension label 630 so that the second sub-label is determined as an extension-purpose label. Next, the P device 510 may continue to determine that the third sub-label carries a private network application identifier based on the label value 100 of the second sub-label and determine the private network application identifier 1 based on the label value 1 of the third sub-label, and perform statistics for a flow (denoted as Flow1) of a private network application with a private network application identifier 1. Then, the P device 510 may remove a public network label 640 of the packet MPLS1 to obtain a packet MPLS1-1 and forward the packet MPLS1-1 to the PE device 522.

The PE device 522 may obtain a packet MPLS1-2 by removing the extension label 630 from the received packet MPLS1-1 and then forward the packet MPLS1-2 to the CE device 534 based on a private network label 620. The CE device 534 may recover the Packet1 by removing the private network label 620 from the received packet MPLS1-2 and then forward the Packet1 to the second host.

Figure 7:
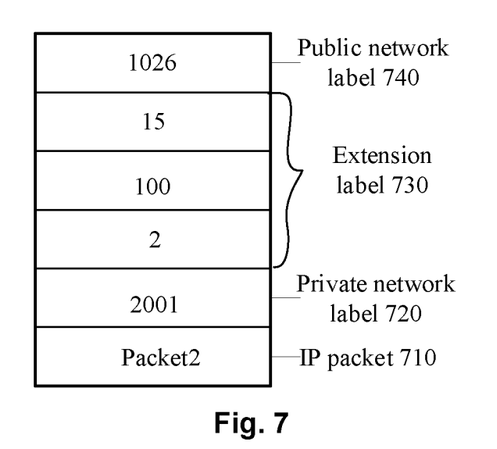
FIG. 7 is a schematic diagram illustrating another MPLS packet apparatus based on an example of the present disclosure.

Similarly, when receiving an IP packet (denoted as Packet2) matched with the ACL entry ACL2, the PE device 521 may assign a private network application identifier 2 to the Packet2 based on the above Table 1. Then, the PE device 521 may obtain an MPLS packet (denoted as MPLS2) shown in FIG. 7 by performing MPLS label encapsulation for the Packet2. An extension label 730 shown in FIG. 7 has the same structure as the extension label 630 shown in FIG. 6 except that the label value of the third sub-label of the extension label 730 shown in FIG. 7 is 2. The PE device 521 may forward the packet MPLS2 to the P device 510.

After receiving the packet MPLS2, the P device 510 may analyze the label of the packet MPLS2 in a same manner as the above packet MPLS1 is analyzed, determine a private network application corresponding to the private network application identifier 2 based on the label value 2 of the third sub-label, and perform statistics for a flow (denoted as Flow2) of the private network application corresponding to the private network application identifier 2. Thereafter, the P device 510 may obtain a packet MPLS2-1 by removing a public network label 740 from the packet MPLS2 and forward the packet MPLS2-1 to the PE device 522.

The PE device 522 may obtain a packet MPLS2-2 by removing the extension label 730 from the received packet MPLS2-1, and forward the packet MPLS2-2 to the CE device 534 based on a private network label 720. Then, the CE device 534 may recover the Packet2 by removing the private network label 720 from the received packet MPLS2-2 and forward the Packet2 to the fourth host.

Further, if it is desired to implement visualization of VPN on the P device 510, the PE device 521 may also configure VPN information when assigning a private network application identifier. For example, in the case that 20 bits of the Label field of the third sub-label in the extension label is used to indicate a VPN to which a packet belongs and a private network application, high four bits of the Label field may be used to indicate a VPN to which private network applications belong, and low sixteen bits of the Label field may be used to indicate specific private network applications in the VPN. As shown in Table 2, the ACL entries ACL1 and ACL2 are configured for private network applications in a VPN1 with an identifier as "1" and the ACL entries ACL3 and ACL4 are configured for private network applications in a VPN2 with an identifier as "2".

TABLE 2

| | Application identifier (20 bits) | |
| --- | --- | --- |
| ACL entry | VPN identifier (high 4 bits) | private network application identifier (low 16 bits) |
| ACL 1 | 1 | 1 |
| ACL 2 | 1 | 2 |
| ACL 3 | 2 | 3 |
| ACL 4 | 2 | 4 |

The P device 510 may identify a VPN to which a current private network application belongs based on a value of the high four bits of the application identifier, and report VPN information of the private network application together when reporting the flow of the private network application to a management device so that a manager may obtain more detailed information. And the P device 510 may also perform statistics for a private network flow based on a VPN. For example, the flow of above VPN1=Flow1+Flow2. In this way, more calculating manners are provided.

Corresponding to examples of the above method of forwarding a packet, the present disclosure also provides an example of an apparatus for forwarding a packet.

Figure 8:
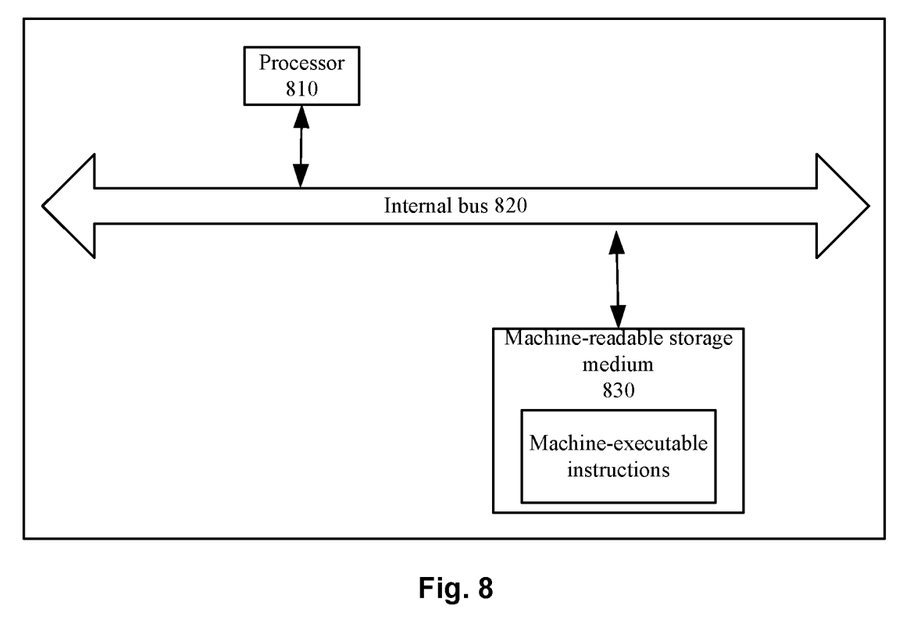
FIG. 8 is a schematic diagram illustrating a structure of a PE device/P device based on an example of the present disclosure.

An example of an apparatus for forwarding a packet may be applied to a PE device/P device. The example of the apparatus for forwarding a packet may be implemented by software and may also be implemented by hardware or a combination thereof. Taking software implementation as an example, the logical apparatus is formed by running corresponding machine-executable instructions in a machine-readable storage medium by a processor on a device where the apparatus is located. From a hardware level, as shown in FIG. 8, it is a schematic diagram illustrating a hardware structure of a device where an apparatus for forwarding a packet is located based on an example of the present disclosure. In addition to a processor 810 and a machine-readable storage medium 830 shown in FIG. 8, the device where the apparatus is located may also include other hardware based on actual functions of the device, which will not be described herein. In addition, the processor 810 may communicate with the machine-readable storage medium 830 via an internal bus 820.

In an example, when the apparatus for forwarding a packet is applied to a PE device, the processor 810 may read and execute the machine-executable instructions in the machine-readable storage medium 830 to:

assign a private network application identifier to a received IP packet; and send an MPLS packet generated based on the IP packet where the private network application identifier is carried in an extension label of the MPLS packet.

In an example, when assigning the private network application identifier to the received IP packet, the processor 810 is further caused by the machine-executable instructions to:

configure an ACL entry for a private network application, where the ACL entry includes a private network application identifier indicating the private network application and packet features of an IP packet belonging to the private network application; and assign the private network application identifier in the ACL entry to the IP packet when packet features of the received IP packet are matched with the ACL entry.

In an example, the extension label comprises:

a third sub-label for carrying the private network application identifier, a second sub-label for indicating that the third sub-label carries a private network application identifier, and a first sub-label for indicating that the second sub-label is an extension-purpose label.

In an example, the extension label further carries information of a Virtual Private Network (VPN) to which the IP packet belongs.

In an example, when the apparatus for forwarding a packet is applied to a P device, the processor 810 may read and execute the machine-executable instructions in the machine-readable storage medium 830 to:

receive an MPLS packet with a private network application identifier carried in an extension label from a PE device; and identify a private network application to which the MPLS packet belongs based on the private network application identifier in the extension label.

In an example, the extension label includes:

a third sub-label for carrying the private network application identifier, a second sub-label for indicating that the third sub-label carries a private network application identifier, and a first sub-label for indicating that the second sub-label is an extension-purpose label;

when identifying the private network application based on the private network application identifier in the extension label, the processor 810 is further caused by the machine-executable instructions to:

obtain a label value of the first sub-label;

obtain a label value of the second sub-label when determining that the second sub-label is an extension-purpose label based on the label value of the first sub-label; and identify the private network application to which the MPLS packet belongs based on a label value of the third sub-label when determining that the third sub-label carries the private network application identifier based on the label value of the second sub-label.

Figure 9:
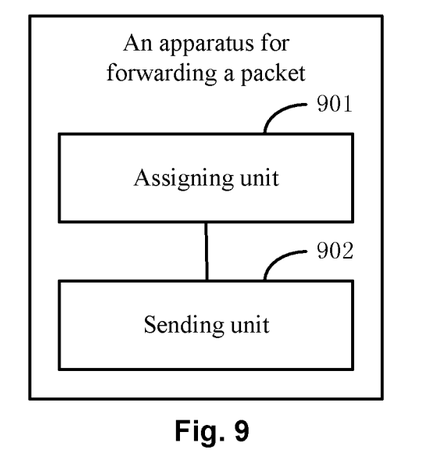
FIG. 9 is a schematic diagram illustrating a structure of an apparatus for forwarding a packet based on an example of the present disclosure.

FIG. 9 is a schematic diagram illustrating a structure of an apparatus for forwarding a packet based on an example of the present disclosure. The apparatus for forwarding a packet may be applied to a Provider Edge (PE) device of a Multi-Protocol Label Switching (MPLS) network and include an assigning unit 901 and a sending unit 902. The assigning unit 901 is configured to assign a private network application identifier to a received Internet Protocol (IP) packet; and the sending unit 902 is configured to send an MPLS packet that is generated based on the IP packet and carries the private network application identifier in an extension label so that a Provider (P) device may identify a private network application based on the private network application identifier carried in the extension label.

The assigning unit 901 may configure an Access Control List (ACL) entry for a private network application. The ACL entry may include a private network application identifier indicating the private network application and packet features of an IP packet belonging to the private network application; when packet features of the received IP packet are matched with the ACL entry, the private network application identifier in the ACL entry may be assigned to the IP packet.

In an example, the extension label may include a first sub-label, a second sub-label and a third sub-label, where the first sub-label is used to indicate that the second sub-label is an extension-purpose label, the second sub-label is used to indicate that the third sub-label carries a private network application identifier and the third sub-label is used to carry the private network application identifier.

In another example, the extension label may also carry information of a VPN to which the IP packet belongs so that the P device determines a VPN to which the private network application belongs.

Figure 10:
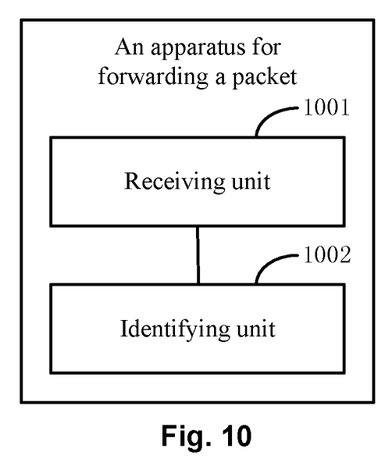
FIG. 10 is a schematic diagram illustrating a structure of another apparatus for forwarding a packet based on an example of the present disclosure.

FIG. 10 is a schematic diagram illustrating a structure of an apparatus for forwarding a packet based on another example of the present disclosure. The apparatus for forwarding a packet may include a receiving unit 1001, and an identifying unit 1002, where the receiving unit 1001 is configured to receive an MPLS packet with a private network application identifier carried in an extension label from a Provider Edge (PE) device; and the identifying unit 1002 is configured to identify a private network application based on the private network application identifier carried in the extension label.

In an example, the extension label may include a first sub-label, a second sub-label and a third sub-label, where the first sub-label is used to indicate that the second sub-label is an extension-purpose label, the second sub-label is used to indicate that the third sub-label carries a private network application identifier and the third sub-label is used to carry the private network application identifier.

The identifying unit 1002 is specifically configured to obtain a label value of the first sub-label; obtain a label value of the second sub-label when it is determined that the second sub-label is an extension-purpose label based on the label value of the first sub-label; and identify a private network application based on a label value of the third sub-label when it is determined that the third sub-label carries a private network application identifier based on the label value of the second sub-label.

Details of the implementation process of the functions and effects of different units in the above-described apparatus may be seen from the implementation process of corresponding blocks in the above-described method, which will not be redundantly described herein.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected based on actual requirements to implement the objectives of the solutions in the embodiments. Those of ordinary skill in the art may understand and carry out them without creative work.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of forwarding a packet, comprising:
assigning, by a Provider Edge PE device, a private network application identifier to a received Internet Protocol IP packet, the private network application identifier being an identifier of a source application of the IP packet in a Virtual Private Network VPN; and
sending, by the PE device, a Multi-Protocol Label Switching MPLS packet generated based on the IP packet, wherein the private network application identifier is carried in an extension label of the MPLS packet,
wherein assigning the private network application identifier to the received IP packet comprises:
configuring, by the PE device, an Access Control List ACL entry for a private network application, wherein the ACL entry comprises a private network application identifier indicating the private network application and packet features of an IP packet belonging to the private network application; and
assigning, by the PE device, the private network application identifier in the ACL entry to the IP packet when packet features of the received IP packet are matched with the ACL entry,
wherein the extension label comprises:
a third sub-label for carrying the private network application identifier,
a second sub-label for indicating that the third sub-label carries a private network application identifier, and
a first sub-label for indicating that the second sub-label is an extension-purpose label,
the first sub-label uses an Extension Label XL in an MPLS protocol, and the second sub-label uses an Extended Special-Purpose MPLS Label ESPL in the MPLS protocol.

2. The method according claim 1, wherein the extension label further carries information of the VPN to which the IP packet belongs.

3. A method of forwarding a packet, comprising:
receiving, by a Provider P device, a Multi-Protocol Label Switching MPLS packet with a private network application identifier carried in an extension label from a Provider Edge PE device, the private network application identifier being an identifier of a source application of the IP packet in a Virtual Private Network VPN; and
identifying, by the P device, a private network application to which the MPLS packet belongs based on the private network application identifier in the extension label,
wherein the extension label comprises:
a third sub-label for carrying the private network application identifier,
a second sub-label for indicating that the third sub-label carries a private network application identifier, and
a first sub-label for indicating that the second sub-label is an extension-purpose label,
the first sub-label uses an Extension Label XL in an MPLS protocol, and the second sub-label uses an Extended Special-Purpose MPLS Label ESPL in the MPLS protocol.

4. The method according to claim 3, wherein,
identifying the private network application based on the private network application identifier in the extension label comprises:
obtaining, by the P device, a label value of the first sub-label;
obtaining, by the P device, a label value of the second sub-label when determining that the second sub-label is an extension-purpose label based on the label value of the first sub-label; and
identifying, by the P device, the private network application to which the MPLS packet belongs based on a label value of the third sub-label when determining that the third sub-label carries a private network application identifier based on the label value of the second sub-label.

5. An apparatus for forwarding a packet, the apparatus being applied to Provider Edge PE device, comprising:
a non-transitory machine-readable storage medium storing machine-executable instructions; and
a processor for executing the machine-executable instructions to:
assign a private network application identifier to a received Internet Protocol IP packet, the private network application identifier being an identifier of a source application of the IP packet in a Virtual Private Network VPN; and
send a Multi-Protocol Label Switching MPLS packet generated based on the IP packet, wherein the private network application identifier is carried in an extension label of the MPLS packet,
wherein when assigning the private network application identifier to the received IP packet, the processor is caused by the machine-executable instructions to:
configure an Access Control List ACL entry for a private network application, wherein the ACL entry comprises a private network application identifier indicating the private network application and packet features of an IP packet belonging to the private network application; and
assign the private network application identifier in the ACL entry to the IP packet when packet features of the received IP packet are matched with the ACL entry,
wherein the extension label comprises:
a third sub-label for carrying the private network application identifier,
a second sub-label for indicating that the third sub-label carries a private network application identifier, and
a first sub-label for indicating that the second sub-label is an extension-purpose label, the first sub-label uses an Extension Label XL in an MPLS protocol, and the second sub-label uses an Extended Special-Purpose MPLS Label ESPL in the MPLS protocol.

6. An apparatus for forwarding a packet, the apparatus being applied to a Provider P device, comprising:
  a non-transitory machine-readable storage medium storing machine-executable instructions; and
  a processor for executing the machine-executable instructions to
    receive a Multi-Protocol Label Switching MPLS packet with a private network application identifier carried in an extension label from a Provider Edge PE device, the private network application identifier being an identifier of a source application of the IP packet in a Virtual Private Network VPN; and
    identify a private network application to which the MPLS packet belongs based on the private network application identifier in the extension label,
  wherein the extension label comprises:
    a third sub-label for carrying the private network application identifier,
    a second sub-label for indicating that the third sub-label carries a private network application identifier, and
    a first sub-label for indicating that the second sub-label is an extension-purpose label,
    the first sub-label uses an Extension Label XL in an MPLS protocol, and the second sub-label uses an Extended Special-Purpose MPLS Label ESPL in the MPLS protocol.

7. The apparatus according to claim 5, wherein the extension label further carries information of the VPN to which the IP packet belongs.

8. The apparatus according to claim 6, wherein
  when identifying the private network application based on the private network application identifier in the extension label, the processor is caused by the machine-executable instructions to:
    obtain a label value of the first sub-label;
    obtain a label value of the second sub-label when determining that the second sub-label is an extension-purpose label based on the label value of the first sub-label; and
    identify the private network application to which the MPLS packet belongs based on a label value of the third sub-label when determining that the third sub-label carries a private network application identifier based on the label value of the second sub-label.

\* \* \* \* \*